United States Patent [19]

Darrieux

[11] Patent Number: 5,086,983
[45] Date of Patent: Feb. 11, 1992

[54] DEVICE FOR APPLYING A FILAMENT WINDING TO A SUPPORT OF ANY SHAPE AND A UNIVERSAL WINDING MACHINE COMPRISING AN APPLICATION THEREOF

[75] Inventor: Jean-Louis Darrieux, Merignac, France

[73] Assignee: Societe Nationale Industrielle et Aerospatiale, Paris, France

[21] Appl. No.: 619,828

[22] Filed: Nov. 28, 1990

Related U.S. Application Data

[63] Continuation of Ser. No. 342,204, Apr. 24, 1989, abandoned.

[30] Foreign Application Priority Data

Apr. 25, 1988 [FR] France .................... 88 04539

[51] Int. Cl.⁵ .................... H01F 41/08; B65H 81/02
[52] U.S. Cl. .................... 242/4 R
[58] Field of Search ............. 242/4 R, 7.03; 156/185, 156/422, 425, 397

[56] References Cited

U.S. PATENT DOCUMENTS 2,721,708 10/1955 Rogers .................... 242/4 C
2,819,850 1/1958 Mathis .................... 242/4 R
2,820,598 1/1958 Aveni .................... 242/4 R
4,553,705 11/1985 Uchida .................... 242/4 R
4,730,777 3/1988 Graul .................... 242/4 R

FOREIGN PATENT DOCUMENTS

2537556 6/1984 France .
0136610 6/1988 Japan .................... 242/4 R Primary Examiner—Katherine Matecki
Attorney, Agent, or Firm—Armstrong, Nikaido, Marmelstein, Kubovcik & Murray

[57] ABSTRACT

Two robot arms (16, 17) controlled by a preprogrammed system support each in turn a thread dispensing cassette (18), one of the arms 16 equipped with the cassette travelling over one part of a winding path 19 around a mandrel 2, at the end of which the cassettee is transferred to the other arm 17, which travels over the other part of the said path up to the point of departure of the first arm, in such a way that the thread is wound around the entire periphery of the mandrel in a movement that is analogous to the placing of a bandage around a limb when the rolled up bandage is passed from one hand to the other while unrolling the said bandage. Application to filament winding of complex shapes, particularly of toroidal articles, is disclosed.

13 Claims, 5 Drawing Sheets

DEVICE FOR APPLYING A FILAMENT WINDING TO A SUPPORT OF ANY SHAPE AND A UNIVERSAL WINDING MACHINE COMPRISING AN APPLICATION THEREOF

This application is a continuation, of application Ser. No. 342,204 filed Apr. 24, 1989, now abandoned.

BACKGROUND OF THE INVENTION

The invention relates to a device for applying a filament winding to a support of any shape, employing at least two robot arms controlled by a preprogrammed device, as well as a universal winding machine comprising an application thereof.

One filament winding technique consists in causing a head for dispensing synthetic or other fibres or threads, preimpregnated or otherwise, to describe a programmed trajectory in the vicinity of a support in such a way that the said fibres or threads are placed under tension at the desired point thereon, by unwinding from storage reels. Filament winding is followed by impregnation with resin when the fibres are not preimpregnated, and the final composite material is obtained after polymerization of the fibre-resin combination. This filament winding is performed, for example, on a solid or hollow mandrel the outer shape of which corresponds to the inner shape of the hollow articles to be produced. When this mandrel is full, it must be possible to withdraw it when the article is formed, which is why it is often made of an agglomerate material, hardenable under ambient atmospheric conditions, but destructible after thermal cycles, for example chemically. When the mandrel is hollow, it is usually formed of a rigid envelope of metal or the like which remains inside the article after polymerization. For winding, the said mandrel is placed on a machine and is generally caused to perform a rotational movement drawing off, by winding it onto itself, the fibre from a reel, itself caused to perform the complementary movements necessary for covering the said mandrel. The articles obtained using machines of this kind are envelopes of a shape that is spherical or cylindrical with dished ends having one or two orifices necessary for their utilization and through which passes the mandrel supporting shaft during filament winding.

For the production of tubes of composite materials, there are also known machines that use a frame rotating about a tube caused to perform a feed movement in relation to the said frame. These machines can thus provide windings about articles tending to be of a spherical or tubular shape, but cannot easily wind around articles of a toroidal shape. For winding filaments around a toroidal element, there is known a device the principle of which consists in causing the said toroidal element to be supported by a train of rolls on which it rotates about its axis, and in causing a material guiding device to rotate about the surface of the toroidal element, a relative movement being generated between the guiding device and the toroidal element so that the material is wound around, a device being provided to compensate for the change in direction of the toroidal element as a result of the winding of the elongated material over the latter, as described in FR A 2 225 372.

In this kind of machine for winding around toric mandrels, there is necessarily a frame for carrying the reels of fibres that passes through the inside of the torus after the fashion of two successive links in a chain. In order to perform the winding, this frame necessarily has to be opened to cause it to enter the torus and then adjusted therein before recommencing the reverse action at the end of winding. This entails difficult assembly and heavy, voluminous auxiliary means. In addition, if there is an obstacle on the toric support, for example a diametrically arranged crossmember, winding has to be interrupted and the frame has to be displaced before winding can be resumed on the other side of the obstacle. As a result, if one wishes for an article of this type of if, generally speaking, one wishes to obtain by filament winding an article comprising one or more obstacles to continuous winding, the use of a dispensing head or of a dispensing frame proves practically impossible. There is also known from FR-A 2 537 556 a device suitable for providing windings on toric supports the principle of which consists in displacing a dispensing reel in axial translation inside the toric support with the help of a mobile arm, in receiving and displacing the said reel upwards, with the help of a second mobile mechanism, so that it can be taken up by a third mechanism using an arm identical to the first one and displaceable in translation parallel to the outside of the toric support, the reel being finally taken up by a fourth member which replaces it on the original arm.

It is easy to imagine that, to ensure correct winding under constant tension from these four reel carrying mechanisms, each of which has to move along a precise trajectory, the problems of synchronization are not easy to solve, not to mention the complexity of the arrangements of these mechanisms.

Furthermore, with the machines described above, it is difficult to change over from one article to an other, if these articles are not of the same shape and size, without modifying or replacing the frame and even the mandrel support. Finally, the toroidal elements in question must have at least a regular external shape in order to be able to rotate easily on their support rolls during the winding operation. These machines are thus suitable for producing series of identical toroidal articles but they are obviously too complex to be used to form, for example, assemblies of tubular parts. Conversely, the machines for forming articles tending to be of a spherical or tubular shape, mentioned earlier, are quite incapable of processing irregular toroidal articles or other articles of any shape at all.

SUMMARY OF THE INVENTION

That is why the Applicant has devised an original device for applying a filament winding, and a machine for implementing the device, which makes it possible to produce any article by filament winding while avoiding the drawbacks proper to the known machines. This machine, thanks its universality, makes it possible to overcome the obstacles of complex supports, hence to produce different tubular structures, as it is capable of assembling tubes to one another. In addition, since it makes it possible to dispense with a reel carrying support that penetrates a complex article such as an article with a toric shape, it obviates the drawbacks inherent in this frame, namely its opening or its closing with respect to the mandrel, as well as its inability to adapt immediately geometrically to the shape of the desired article, and also its volume.

Finally, it does not necessitate the use of a large number of mechanical members and tends towards simplification and greater efficiency.

A first object of the present invention thus consists in a device for applying a filament winding onto a support of any shape, wherein the said support or mandrel is placed on a machine which imparts thereto possibly at least one movement and according to which at least one thread dispensing reel is mounted on a support caused to perform a relative movement in relation to the mandrel so that the thread is wound onto the said support along a trajectory resulting from the combination of the movement of the mandrel and the movement of the dispensing reel, a device according to which only two robot arms controlled by a preprogrammed system support each in turn a thread dispensing cassette, one of the arms provided with the cassette travelling over a part of a winding path about the mandrel at the end of which the cassette is transferred to the other arm, which travels over the other part of the said path up to the point of departure of the first arm, in such a way that the thread is wound around the entire periphery of the mandrel in a movement that is analogous to the winding of a bandage around a limb when the rolled bandage is passed from one hand to the other as the said bandage is unwound.

Advantageously, each robot arm ends in a pincer with preprogrammed opening and closing designed to seize one of the two gripping spindles of the cassette, the end of each robot arm ending in a rotary sleeve on which is mounted a rotary support of the pincer cooperating with two semi-circular portions capable of moving apart or coming together. Provision is made for the two robot arms to travel together, one above the other, over a small common path in two opposite zones of the complete winding path, to permit the transfer of the cassette from one arm to the other without interrupting the winding operation.

According to another special feature of the invention, there is provided a joining station for bonding together the cassette threads, which station consists of a plate framed by two grippers capable of pressing the threads and holding them against the plate, and which also consists of a thread cutter and an applicator member that can be applied to the superposed threads to ensure their adhesion.

Another object of the present invention consists of a universal winding machine comprising an application of the device and which comprises at least two robot arms each mounted on a support base in the vicinity of a frame supporting the mandrel, the robot arms being controlled by a preprogrammed device and supporting each in turn a thread dispensing cassette to cause it to travel in a continuous movement along the winding path around the said mandrel, and also comprising a thread joining station, permitting the bonding together of the threads, magazines being provided for the empty or full cassettes, served by the robot arms.

BRIEF DESCRIPTION OF THE DRAWINGS

Further special features and advantages of the invention will become apparent from reading the description that follows of non-limitative examples of forms of embodiment of the invention with reference to the annexed drawings wherein:

FIG. 2 is a perspective view of the support for a toroidal mandrel, while

DETAILED DESCRIPTION OF THE PREFERRED EMBODIMENTS

Figure 1:
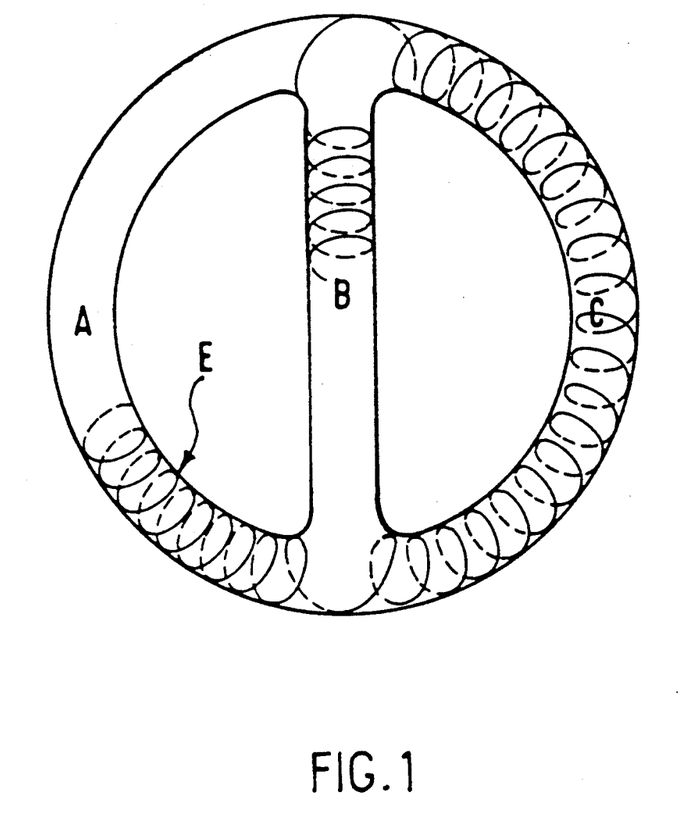
FIG. 1 is a schematic plan view of a type of mandrel capable of receiving a winding according to the device of the invention.

FIG. 1 schematically illustrates an example of a complex structure that known devices and machines are unable to produce by filament winding without successive transfers of the article in question. This toroidal article, formed of two semicircular portions A and C, comprises a diametrical portion B. There is partially represented a winding E that it is wished to provide over portion A, then over C, then over B, before continuing again over A, C, etc. A device with a reel carrying frame of the kind described in FR-A 2 225 372, when placed around portion A, will be able to perform winding up to the obstacle constituted by the crossmember B. In order to go over to portion C, it will thus be necessary to open the frame in order to displace it or to use another frame around C which would take up the thread at the obstacle in order to cause it to travel over portion C. Then a new obstacle A presents itself if it is wished to transfer from C across B, another when transferring from B to A, etc. Each obstacle thus necessitates a transfer of the winding, which makes the operation technically very difficult when using known devices. The invention described with reference to FIG. 2 to 10 would permit the production, in particular, of this type of structure.

Figure 2:
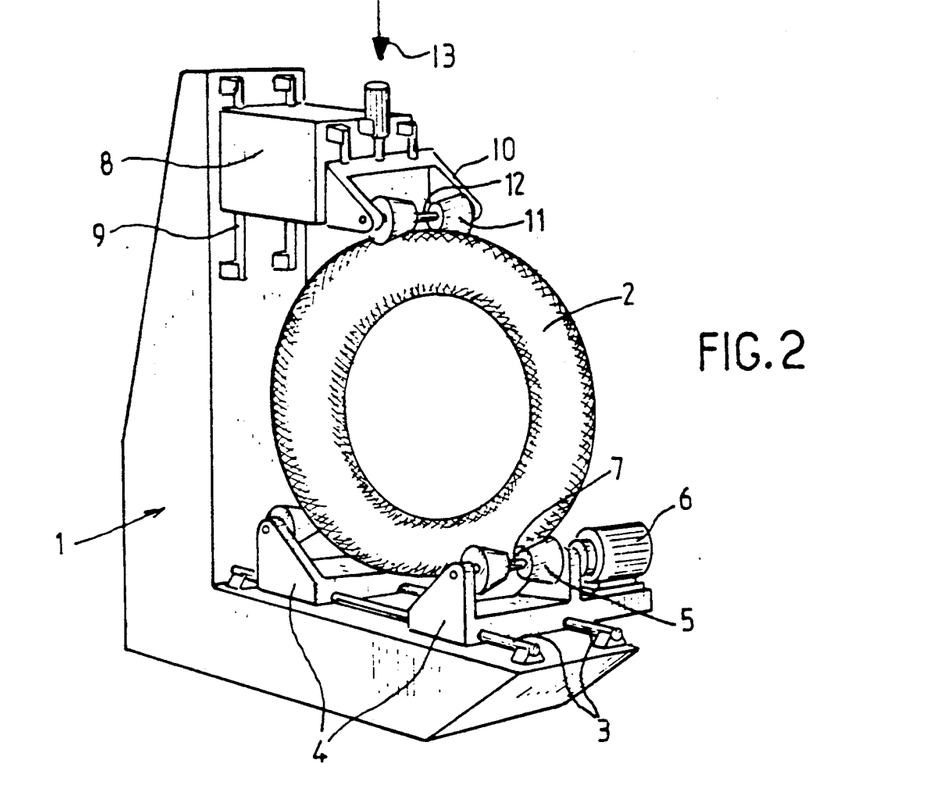

FIG. 2 shows an L-shaped frame 1 serving as a support for a toroidally shaped mandrel 2. On the base of frame 1 are mounted two slides 3 along which can move two yokes 4 each bearing two rollers 5 driven in rotation by a motor 6 through the intermediary of a shaft 7. It will be noted that each of the two rollers 5 can move away from the other more or less as a function of the thickness of the mandrel supported by them, an automatic return mechanism, not shown, tending to bring them together to imprison the mandrel. On the vertical part of the frame 1 is fixed a jib 8 capable of moving along vertical slides 9, said jib being provided at its end with a yoke 10 bearing two supporting and guiding rollers 11, also capable of moving away from one another along their spindle 12. The weight of the jib or a vertical force exerted thereon in the direction of arrow 13 maintains a constant pressure on the apex of the mandrel 2, even if its external rolling surface is not regular, owing to its mobility along slides 9. It will be appreciated that, in this position, the mandrel rests vertically on the sets of rollers 5 which cause it to rotate, while remaining held in position by the upper guiding rollers 11.

Figure 4:
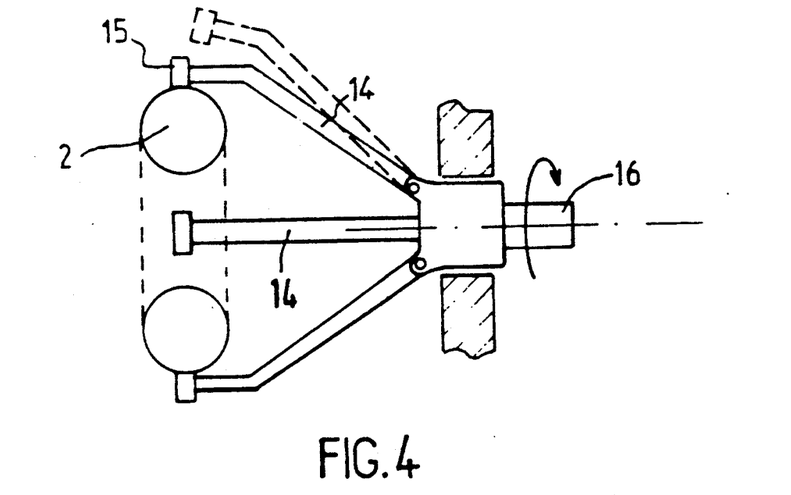
FIG. 4 is a cross-sectional view of an alternative mandrel support.
Figure 5:
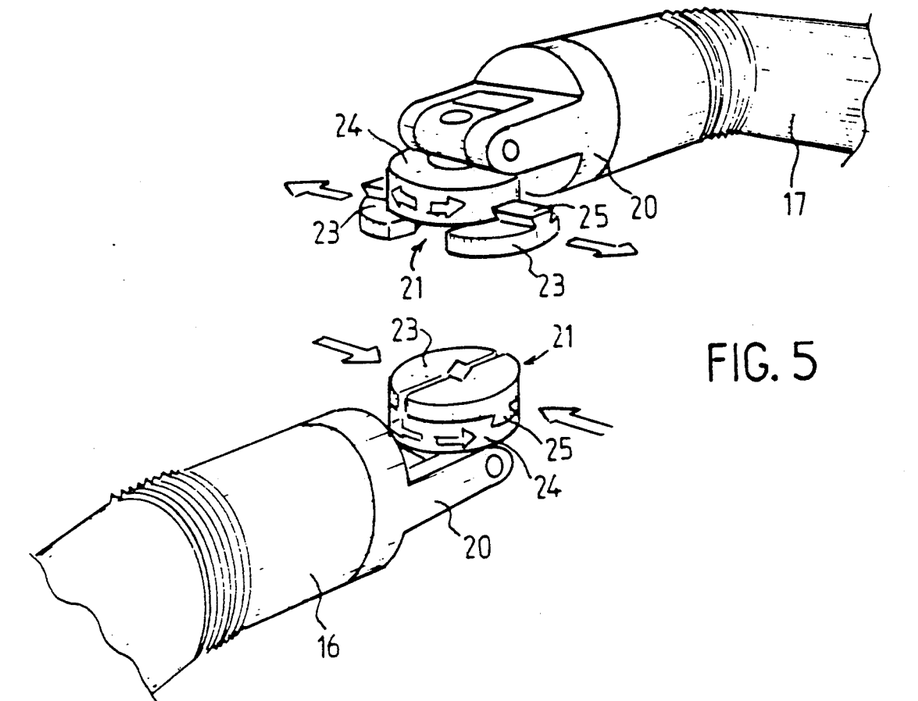
FIG. 5 is larger scale perspective view of the ends of the robot arms showing the gripping pincers.

The spindle holding device illustrated in FIG. 2 could be designed differently, for example as represented in FIG. 4 with the help of arms 14, at least four in number, which grip mandrel 2 by holding rollers 15, the arm-mandrel assembly being able to rotate about a shaft 16 which is mobile in relation to the adjacent support frame. A mechanism would be provided to ensure that the arms retract each in turn at the time of depositing the thread. An arm 14 taking up a retracted position at such a time is shown in dashed lines. It is thus necessary to provide for at least a certain number of arms to hold the mandrel and to cause it to rotate without being unbalanced when one of the arms retracts.

Figure 3:
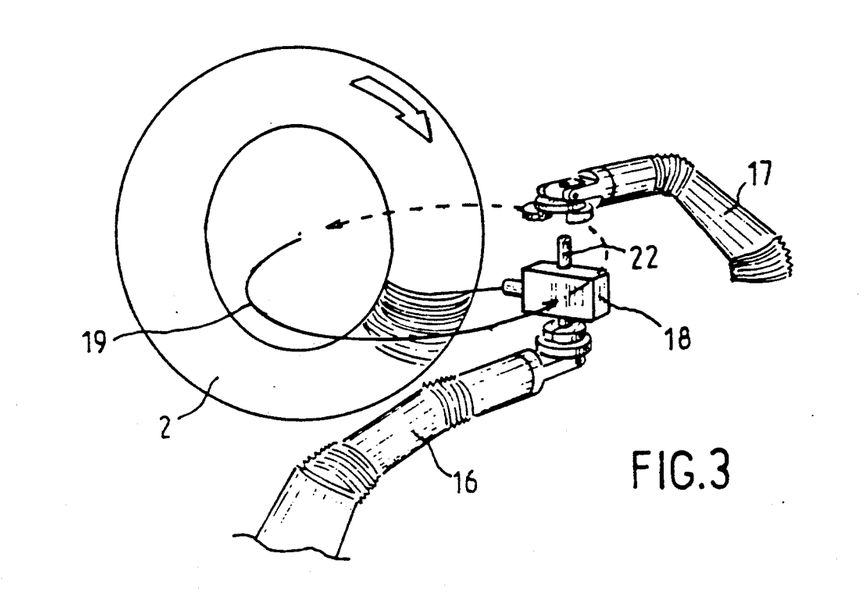
FIG. 3 is a schematic view of the said mandrel and of the robot arms performing the winding.
Figure 6:
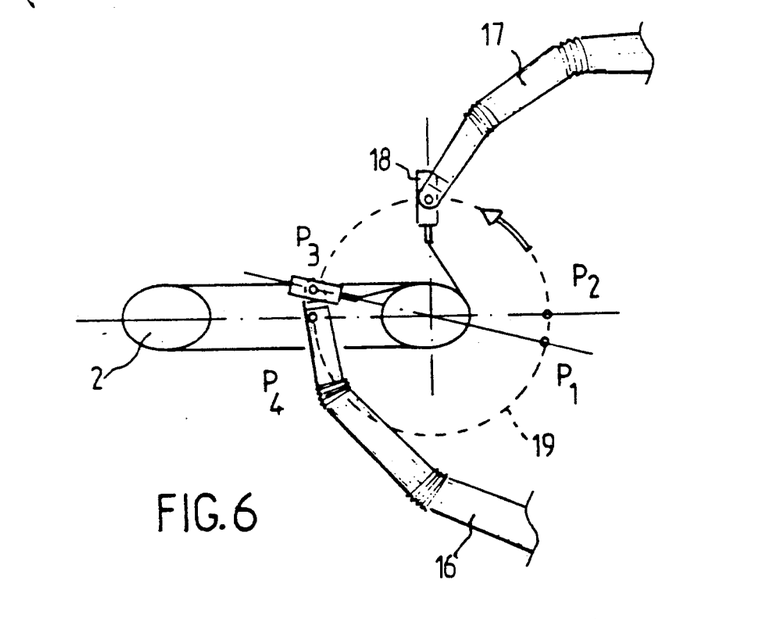
FIG. 6 schematically represents in plan view the stages of winding using the two robot arms.

The mandrel being thus held, for example, by means of the supports in FIG. 2, a description will now be given of the device for applying the filament winding thereto. The principle applied, illustrated in FIG. 3, is analagous to that used when putting a bandage around a limb, the natural gesture of the user being to pass the rolled bandage from one hand to another, at the same time unrolling the said bandage to apply it by winding around the limb. In the case in point, the device for applying the filament winding has to reproduce these movements, and so it uses at least two robot arms 16, 17, controlled by a preprogrammed device, which support each in turn a fibre dispensing cassette 18, each of the arms performing part of the winding on the mandrel, before the cassette is taken up by the other arm to provide the other part of the complete winding, the combination of the movement of the two arms and the transfer of the cassette from one to the other permitting continuous application of fibres to the mandrel 2 in the plane of rotation 19. The ends of the robot arms 16 and 17 are shown in greater detail in FIG. 5. They end in a rotary sleeve 20 on which is mounted a pincer 21 with preprogrammed opening and closing designed to seize one of the two gripping spindles of a cassette. On the sleeve of the upper arm 17, the pincer is shown open, while, one the sleeve of the lower arm 16, it is shown closed. Each pincer 21 comprises two semi-circular portions 23 capable of moving apart or of coming together, which portions are carried by a rotary support 24 with which they cooperate by means of a sliding link 25; the closure or the opening is commanded by a mechanism not shown. Thus, when the pincer of one arm closes, the other opens and the cassette can pass from one arm to the other. This operation can take place with the cassette halted and the mandrel halted. However, advantageously, the transfer can take place without the cassette being immobilized, the latter remaining in movement as shown in the diagram in FIG. 6 illustrating the transfer.

It can be seen that the cassette has to rotate continuously over the winding path 19, about the mandrel 2. While the arm 17 performs its part of the winding between point $P_1$ and point $P_3$ which is diametrically opposite, i.e. by covering half of the path 19 and, consequently, half of the mandrel, the other arm will have returned without a cassette from point $p_2$ to point $P_3$ at a higher speed to be in position at point $P_3$ to seize the cassette released by arm 17. The two arms, 16 and 17 travel together, one above the other, over a short common path between $P_3$ and $P_4$. During this travel, the pincer of arm 16 closes on one gripping spindle of the cassette, then the other pincer of arm 17 opens, releasing the other spindle. Starting from $P_4$, the cassette, drawn by arm 16 up to point $P_2$, carries out the other half of the winding. Arm 17 having returned to $P_1$, the transfer of the cassette from arm 16 to arm 17 will take place in an analogous manner over the common path between $P_1$-$P_2$. There is thus obtained continuous rotation of cassette 18 about the mandrel, at a constant speed, and indexed to the rotation of the said mandrel.

As the dispensing cassettes cannot contain an inexhaustible quantity of thread, when major winding operations are involved, it is appropriate to provide for the replacement of an empty cassette by a full one. It is necessary at that moment to ensure the joining of the thread applied to the mandrel to that of the new cassette. This takes place at the joining station illustrated in FIGS. 7 to 9. The station essentially comprises a plate 26 framed by two grippers 27 capable of pressing the thread 28 and of maintaining it against the plate. In the vicinity of one of the grippers 27 is placed a thread cutter 29.

Figure 7:
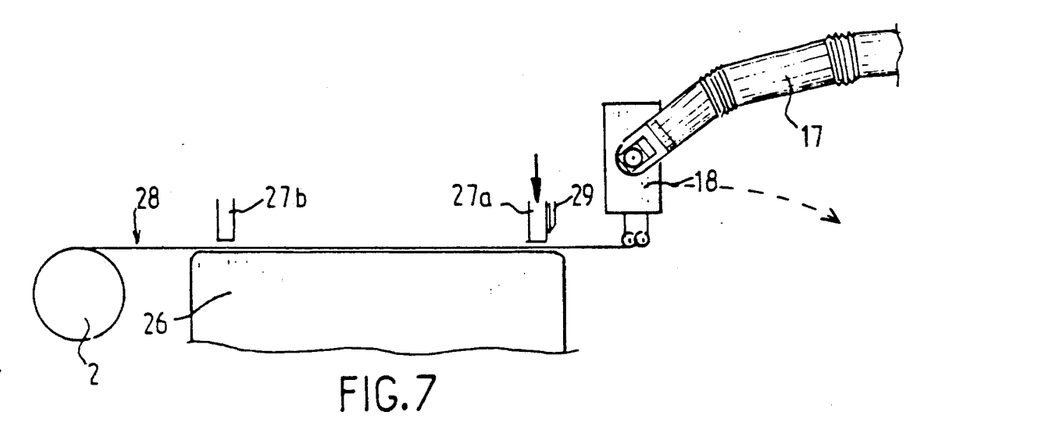
FIGS. 7 to 9 schematically illustrate the operation of the thread joining station.
Figure 8:
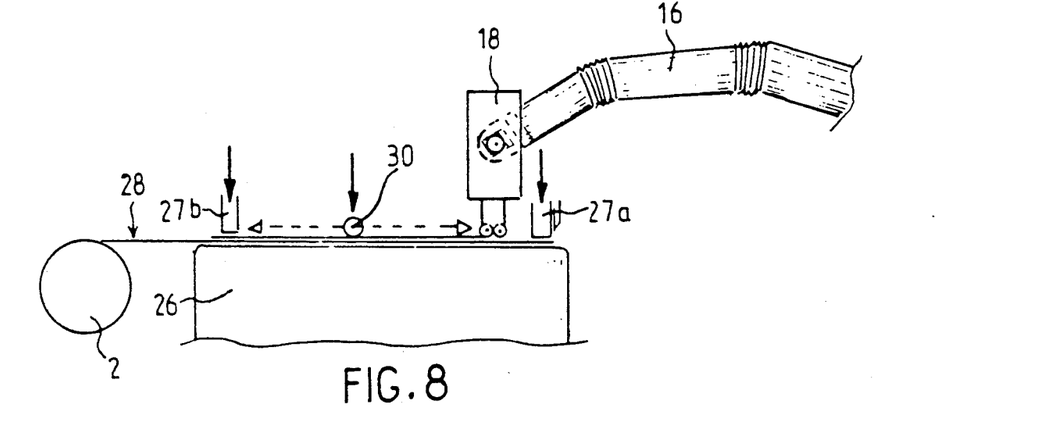
Figure 9:
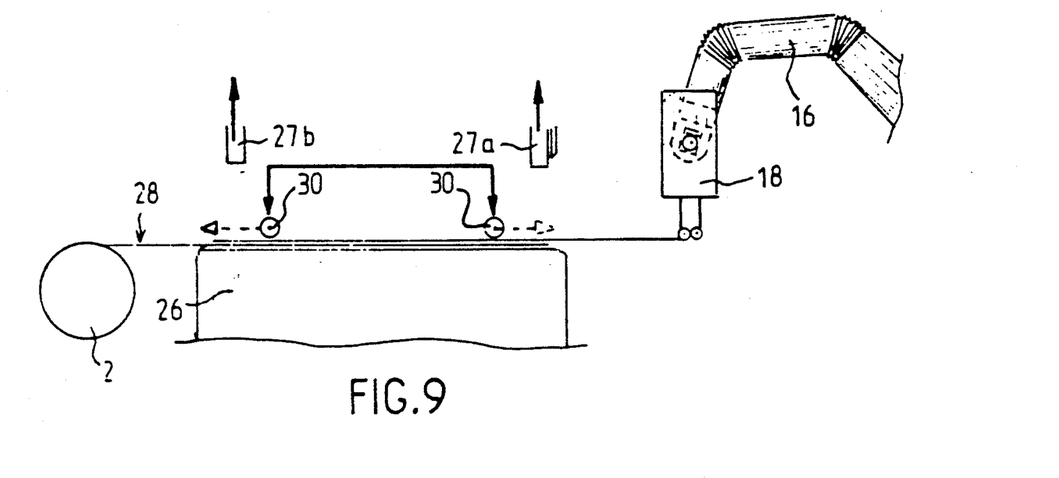

When it is wished to join a thread 28 from the article to be wound (mandrel 2) to the thread from a new cassette, held by a robot arm, the first step is to press a section of the thread 28 against plate 26 with the gripper 27a the further away from the mandrel (FIG. 7). Then, the end of thread left over between the gripper and the cassette is cut using the thread cutter 29. The empty, or almost empty, cassette 18 held by the robot arm 17 can then be removed to a place of storage provided for this purpose. During this time, another robot arm 16 seizes a full cassette from a presenting means and brings it to the joining station. The end of the free thread hanging from this cassette will be brought onto the plate, up to the other gripper 27b, closer to mandrel 2 to be held there, and this portion of thread will thus rest on the preceding portion, a guide means possibly being used to help superpose them (FIG. 8). The two threads being thus superposed, the second thread also being held, moreover, by the cassette itself, a roller 30 serving as the applicator member then rolls over the threads to ensure their bonding together, for example by distributing between them an appropriate adhesive. Then grippers 27a and 27b withdraw from the plate 26. The new cassette 18 then moves away from plate 26 (FIG. 9) which makes it possible to complete the bonding of the threads, by means of roller 30, over the entire length of the joining station. Arm 16 and its cassette can then return to the winding, reincorporating the portion of the bonded thread thanks to an built-in spring system with which the cassette is fitted. The winding of the article can thus continue until the time of the next reel change.

Thanks to the device described above, all types of winding operation can thus be performed.

Figure 10:
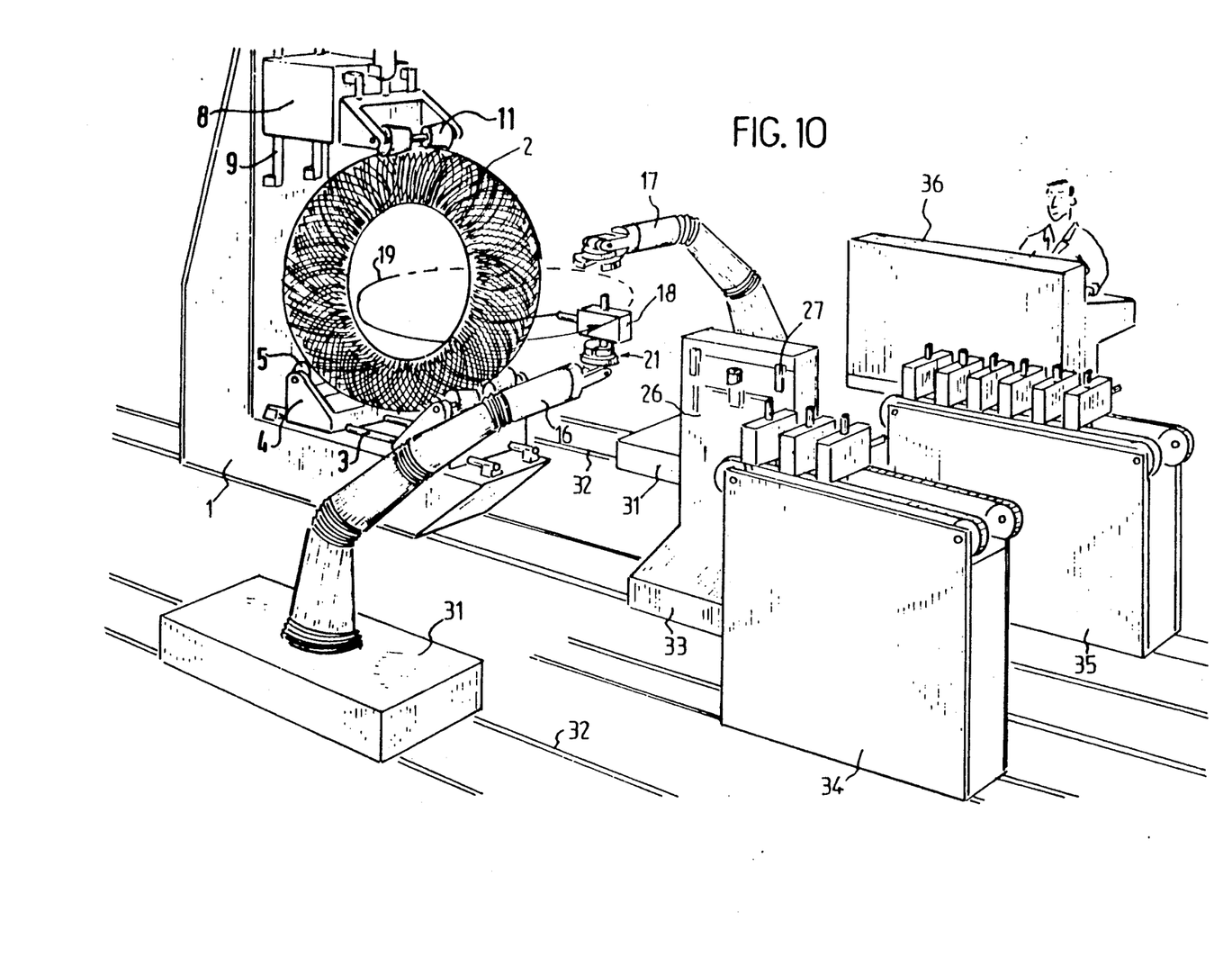
FIG. 10 is a perspective view of a universal winding machine.

The universal winding machine as presented by way of example in FIG. 10 makes it possible to adapt to several types of mandrel and to carry out winding by applying the device described. In this figure can be seen the L-shaped frame 1 enabling the mandrel 2 to be supported as described with reference to FIG. 2. Each of the two robot arms, 16 and 17, is mounted on a support base 31 that can move along rails 32, enabling the arms to be positioned correctly in relation to the mandrel. A thread joining station 33, which can also be moved between the two robot arms, can be advanced into the vicinity of the mandrel when it is wished to join threads together. The plate 26 and the grippers 27 are provided on one side of station 33. Finally, there are provided near at hand a magazine 34 of empty cassettes and another magazine, 35, of full cassettes, likewise displaceable to be able to approach station 33 at the time of thread joining. The machine is preprogrammed and controlled from a fixed monitoring and control station 36.

This machine can thus be used to perform all types of winding of hollow articles of any geometrical shape desired: toric, spherical, cylindrical with dished ends, rectilinear or curved tubes. It is thus possible to obtain any type of article for which it is necessary to release a reel of thread and take it up again after going round a possible obstacle.

I claim:

1. A winding apparatus for applying a filament to a mandrel of any shape, comprising:
   mandrel support means for movably supporting said mandrel;
   at least one dispensing cassette for dispensing a filament to be wound around said mandrel;
   first and second robot arms;
   first and second cassette support means connected respectively to ends of said first and second robot arms for releasably supporting said dispensing cassette;
   control means for controlling movement of said robot arms over a winding path and for actuating each of said cassette support means such that the end of said first robot arm travels over a part of said winding path while said first support means supports said dispensing cassette a predetermined distance away from said mandrel, said first and second cassette support means are actuated to transfer said dispensing cassette from said first cassette support means to said second support means, and the end of said second robot arm travels over the remaining part of said winding path while said second support means supports said dispensing cassette a predetermined distance away from said mandrel;
   wherein said second robot arm returns said dispensing cassette to the end of said first robot arm, and said first and second cassette support means are actuated to transfer said cassette from said second support means to said first support means;
   wherein said first and second support means alternately support said dispensing cassette a predetermined distance away from said mandrel as the ends of said first and second robot arms travel the entire distance of said winding path; and
   wherein only said filament and said mandrel support means contact said mandrel while said filament is wound around said mandrel;
   said cassette support means at said ends of said first and second robot arms include pincer means and said dispensing cassette comprises two gripping spindles, wherein said control means further controls said pincer means to open and close so as to release and seize said gripping spindles;
   said ends of said robot arms further include a rotating sleeve connecting said pincer means to said robot arms, said pincer means comprising a rotating support and two semi-circular portions movable toward and away from each other.

2. A winding apparatus according to claim 1, further comprising drive means for imparting movement to said mandrel in at least one direction.

3. A winding apparatus for applying a filament to a mandrel of any shape, comprising:
   mandrel support means for movably supporting said mandrel;
   at least one dispensing cassette for dispensing a filament to be wound around said mandrel;
   first and second robot arms;
   first and second cassette support means connected respectively to ends of said first and second robot arms for releasably supporting said dispensing cassette;
   control means for controlling movement of said robot arms over a winding path and for actuating each of said cassette support means such that the end of said first robot arm travels over a part of said winding path while said first support means supports said dispensing cassette a predetermined distance away from said mandrel, said first and second cassette support means are actuated to transfer said dispensing cassette from said first cassette support means to said second support means, and the end of said second robot arm travels over the remaining part of said winding path while said second support means supports said dispensing cassette a predetermined distance away from said mandrel;
   said mandrel support means comprising two sets of driven rollers for movably supporting said mandrel thereabove and a set of guide rollers movably positioned above said mandrel along vertical slides such that said guide rollers bias said mandrel against said driven rollers, wherein said drive means imparts movement to said mandrel through said driven rollers;
   wherein said second robot arm returns said dispensing cassette to the end of said first robot arm, and said first and second cassette support means are actuated to transfer said cassette from said second support means to said first support means;
   wherein said first and second support means alternately support said dispensing cassette a predetermined distance away from said mandrel as the ends of said first and second robot arms travel the entire distance of said winding path; and
   wherein only said filament and said mandrel support means contact said mandrel while said filament is wound around said mandrel.

4. A winding apparatus according to claim 3, further comprising two support bases, each said support base supporting one of said robot arms, said mandrel support means further comprising a frame for supporting said mandrel therein, and wherein said joining station further comprises at least two magazines for receiving respectively empty and full dispensing cassettes, said magazines being served by said robot arms.

5. A winding apparatus according to claim 4, wherein said support bases are displaceable along rails for variably positioning said robot arms in relation to said frame.

6. A winding apparatus according to claim 4, wherein said frame comprises an L-shaped frame, and wherein said driven rollers are mounted via slidable yolks on the base of said L-shaped frame.

7. A winding apparatus according to claim 6, further comprising a jib fixed on a vertical portion of said L-shaped frame, said jib being movable along said vertical slides and supporting said guide rollers.

8. A winding apparatus for applying a filament to a mandrel of any shape, comprising:
   mandrel support means for movably supporting said mandrel;
   at least one dispensing cassette for dispensing a filament to be wound around said mandrel;
   first and second robot arms;
   first and second cassette support means connected respectively to ends of said first and second robot arms for releasably supporting said dispensing cassette;
   control means for controlling movement of said robot arms over a winding path and for actuating each of said cassette support means such that the end of said first robot arm travels over a part of said winding path while said first support means supports said dispensing cassette a predetermined distance away from said mandrel, said first and second cassette support means are actuated to transfer said dispensing cassette from said first cassette support means to said second support means, and the end of said second robot arm travels over the remaining part of said winding path while said second support means supports said dispensing cassette a predetermined distance away from said mandrel;

wherein said second robot arm returns said dispensing cassette to the end of said first robot arm, and said first and second cassette support means are actuated to transfer said cassette from said second support means to said first support means;

wherein said first and second support means alternately support said dispensing cassette a predetermined distance away from said mandrel as the ends of said first and second robot arms travel the entire distance of said winding path; and wherein only said filament and said mandrel support means contact said mandrel while said filament is wound around said mandrel;

said apparatus further comprising, a joining station for bonding together two filaments from two different dispensing cassettes, said joining station comprising:

a plate for supporting said two filaments thereon in superposed relation;

pressing means for pressing said filaments against said plate at opposite ends thereof;

applicator means for applying an adhesive over said superposed filaments to bond the filaments together; and cutting means for cutting an end of said superposed filaments after they have been bonded together.

9. A winding apparatus according to claim 8, wherein said applicator means comprises a roller for applying said adhesive to said superposed filaments.

10. A winding apparatus according to claim 8, wherein said joining station is displaceable between said robot arms and wherein said plate, said pressing means, and said applicator means are disposed together on one side of said joining station.

11. A winding apparatus for applying a filament to a mandrel of any shape, comprising:

mandrel support means for movably supporting said mandrel;

at least one dispensing cassette for dispensing a filament to be wound around said mandrel;

first and second robot arms;

first and second cassette support means connected respectively to ends of said first and second robot arms for releasably supporting said dispensing cassette;

control means for controlling movement of said robot arms over a winding path and for actuating each of said cassette support means such that the end of said first robot arm travels over a part of said winding path while said first support means supports said dispensing cassette a predetermined distance away from said mandrel, said first and second cassette support means are actuated to transfer said dispensing cassette from said first cassette support means to said second support means, and the end of said second robot arm travels over another part of said winding path while said second support means supports said dispensing cassette a predetermined distance away from said mandrel;

said control means including means for moving said ends of said robot arms travel in unison over two segments of said winding path while said dispensing cassette is simultaneously supported by both said first and second cassette support means, said segments being located substantially diametrically from each other along said winding path, so that said dispensing cassette is transferred between said first and second cassette means without interruption;

wherein said second robot arm returns said dispensing cassette to the end of said first robot arm, and said first and second cassette support means are actuated to transfer said cassette from said second support means to said first support means;

wherein said first and second support means alternately support said dispensing cassette a predetermined distance away from said mandrel as the ends of said first and second robot arms travel the entire distance of said winding path; and, wherein only said filament and said mandrel support means contact said mandrel while said filament is wound around said mandrel.

12. A winding apparatus according to claim 11, further comprising drive means for imparting movement to said mandrel in at least one direction.

13. A winding apparatus according to claim 11 wherein said cassette support means at said ends of said first and second robot arms include pincer means and said dispensing cassette comprises two gripping spindles, wherein said control means further controls said pincer means to open and close so as to release and seize said gripping spindles.

* * * * *